(12) United States Patent
Sugishita et al.

(10) Patent No.: US 9,124,117 B2
(45) Date of Patent: Sep. 1, 2015

(54) CHARGING DEVICE

(71) Applicant: NICHICON CORPORATION, Kyoto (JP)

(72) Inventors: Haruto Sugishita, Kyoto (JP); Shigeo Ohkuma, Kyoto (JP); Takamasa Mitsuya, Kyoto (JP)

(73) Assignee: Nichicon Corporation, Kyoto (JP)

( * ) Notice: Subject to any disclaimer, the term of this patent is extended or adjusted under 35 U.S.C. 154(b) by 115 days.

(21) Appl. No.: 14/115,189

(22) PCT Filed: Oct. 1, 2012

(86) PCT No.: PCT/JP2012/075372
§ 371 (c)(1),
(2) Date: Nov. 1, 2013

(87) PCT Pub. No.: WO2013/054681
PCT Pub. Date: Apr. 18, 2013

(65) Prior Publication Data
US 2014/0084853 A1 Mar. 27, 2014

(30) Foreign Application Priority Data
Oct. 11, 2011 (JP) ................................ 2011-224330

(51) Int. Cl.
H02J 7/00 (2006.01)
H02J 7/02 (2006.01)
H01M 10/0525 (2010.01)

(52) U.S. Cl.
CPC ............... *H02J 7/0052* (2013.01); *H02J 7/022* (2013.01); *H01M 10/0525* (2013.01); *H01M 2220/20* (2013.01); *Y02T 10/7011* (2013.01)

(58) Field of Classification Search
CPC ..................................................... Y02T 90/128
USPC ........................................................ 320/107
See application file for complete search history.

(56) References Cited

U.S. PATENT DOCUMENTS

| 5,381,298 | A | * | 1/1995 | Shaw et al. .................... 361/232 |
| 5,527,637 | A | * | 6/1996 | Nakazawa et al. .............. 429/99 |
| 5,686,815 | A | * | 11/1997 | Reipur et al. .................. 320/116 |
| 5,864,220 | A | * | 1/1999 | Reipur et al. .................. 320/134 |
| 5,929,593 | A | | 7/1999 | Eguchi |
| 2006/0108956 | A1 | * | 5/2006 | Clark et al. .................... 318/139 |
| 2006/0145665 | A1 | * | 7/2006 | Zemke et al. .................. 320/133 |

(Continued)

FOREIGN PATENT DOCUMENTS

| GB | 2 476 848 | 7/2001 |
| JP | 6-197531 | 7/1994 |

(Continued)

*Primary Examiner* — Suchin Parihar
(74) *Attorney, Agent, or Firm* — Jordan and Hamburg LLP

(57) ABSTRACT

The present invention addresses the problem of providing a charging device capable of precisely outputting charging power to a battery or the like within a broad voltage range of tens-to-hundreds of volts. This charging device comprises: a converter unit that outputs a charging voltage to a battery and a control unit that outputs a control signal of a pulse width determined on the basis of the voltage value of the charging voltage to a switching element of the converter unit, thereby setting the switching element to a conducting state for only a time corresponding to the pulse width. The control unit changes the output interval for the control signal in accordance with the output interval for the control signal as the voltage value of the charging voltage decreases.

3 Claims, 3 Drawing Sheets

(56) References Cited

U.S. PATENT DOCUMENTS

| | | | |
|---|---|---|---|
| 2006/0278450 A1* | 12/2006 | Shirasaka et al. | 180/65.3 |
| 2008/0316710 A1* | 12/2008 | Seto et al. | 361/704 |
| 2010/0194463 A1* | 8/2010 | Moon et al. | 327/427 |
| 2011/0006744 A1 | 1/2011 | Dearborn | |
| 2011/0057637 A1 | 3/2011 | Liu | |
| 2012/0223575 A1* | 9/2012 | Hachiya et al. | 307/9.1 |
| 2013/0049666 A1* | 2/2013 | Osugi | 318/503 |
| 2014/0217958 A1* | 8/2014 | Verdun et al. | 320/107 |

FOREIGN PATENT DOCUMENTS

| | | |
|---|---|---|
| JP | 2002-112465 | 4/2002 |
| JP | 2003-521210 | 7/2003 |
| JP | 2005-348468 | 12/2005 |
| JP | 2008-301638 | 12/2008 |
| JP | 2009-2400001 | 10/2009 |
| WO | WO-01/56132 | 8/2001 |

\* cited by examiner

CHARGING DEVICE

TECHNICAL FIELD

The present invention relates to charging devices for charging batteries or the like, particularly to a charging device that outputs charging power in a wide voltage range of from tens to hundreds of volts to a battery or suchlike.

BACKGROUND OF THE INVENTION

With recent diffusion of electric vehicles, there is an increasing need for a charging device capable of quickly charging a high-capacity in-vehicle battery in a short period of time such as about ten minutes.

Normally, such a charging device converts an alternating-current voltage, which is supplied externally, into a direct-current voltage by rectification and smoothing, and thereafter the device generates charging power at a desired voltage value by a converter portion stepping up or down the direct-current voltage, and outputs the power to the in-vehicle battery, thereby charging the in-vehicle battery.

Conventionally, various charging devices for in-vehicle batteries are under study, and in general, the charging voltage is set at a desired value through PWM control by which the duty cycle of a switching element included in the converter portion is changed on the basis of the value of the charging voltage, as in Patent Documents 1 and 2.

PRIOR ART DOCUMENT

Patent Document

Patent Document 1: Japanese Laid-Open Patent Publication No. 2002-112465

Patent Document 2: Japanese Laid-Open Patent Publication No. 2009-240001

SUMMARY OF THE INVENTION

Unlike in-vehicle charging devices (i.e., charging devices built in vehicles in combination with in-vehicle batteries), stationary charging devices, such as those provided at a charging station or suchlike, have a specific issue where in-vehicle batteries to be charged are not specified.

Accordingly, to support the charging of any in-vehicle batteries, the stationary charging device is required to be capable of outputting charging power in a wide voltage range of from tens to hundreds of volts. However, conventional charging devices are not capable of outputting relatively low charging voltages of some tens of volts with high accuracy.

This issue will be described below with reference to FIG. 4.

Under PWM control, the charging device for an in-vehicle battery increases the duty cycle of the switching element to raise the value of the charging voltage, and decreases the duty cycle to lower the value of the charging voltage.

In other words, the charging device widens the pulse width of a control signal that renders the switching element in an on-state, to output a charging voltage of hundreds of volts, and the charging device narrows the pulse width of the control signal, to output a charging voltage of tens of volts.

However, the linearity of the duty cycle (pulse width) over the charging voltage is maintained only in the range where the duty cycle is relatively high (in FIG. 4, in the range of 20% or higher), whereas in the range where the duty cycle is lower (in the range of less than 20%), i.e., in the range where the pulse width of the control signal is narrow, each element included in the converter portion cannot follow the control signal, so that the value of the charging voltage cannot be set at a desired value.

Note that this issue can be alleviated to some extent by using an expensive element that supports high-speed switching or by using inexpensive elements connected in parallel to achieve equivalent performance to the expensive element, but such an approach inevitably results in increased production cost and an increased device size accompanied by an increased number of elements.

The present invention has been made in view of the above circumstances, and a problem thereof is to provide a charging device capable of outputting charging power in a wide voltage range of from tens to hundreds of volts to a battery or suchlike with high accuracy.

To solve the aforementioned problem, a charging device according to the present invention includes a converter portion for outputting charging power to a charging subject, and a control portion for outputting a control signal having a pulse width determined based on a value of the charging voltage to a switching element in the converter portion, thereby rendering the switching element in an on-state for a time period corresponding to the pulse width, and the control portion changes an interval at which to output the control signal in accordance with the value of charging voltage, thereby lengthening the output interval of the control signal as the value of charging voltage decreases.

With this configuration, the output interval of the control signal, in addition to the pulse width thereof, can be changed, and therefore, the value of the charging voltage that is to be outputted can be kept low by lengthening the interval at which to output the control signal, rather than by narrowing the pulse width of the control signal.

Specifically, this configuration allows the converter portion to always operate in the range where the linearity of the duty cycle over the charging voltage is maintained, so that charging power in a wide range of from tens to hundreds of volts can be outputted with high accuracy.

Note that the term "output interval" as used herein refers to a period from the time a control signal starts to be outputted to the time the next control signal starts to be outputted. It should be note that the term does not refer to a period in which no control signal is outputted.

The control portion of the charging device can be configured so as to regularly omit the control signal which is otherwise kept outputted at predetermined intervals, thereby lengthening the output interval of the control signal that is actually outputted.

The "predetermined intervals" is intended to mean, for example, intervals between control signals (pulse signals) being outputted at the fastest timing realized by hardware characteristics.

Furthermore, to regularly omit the control signal, the control portion includes a storage portion having count defaults stored therein in correlation with values of the charging voltage, a pulse width determination portion for determining a pulse width of the control signal on the basis of a value of the charging voltage and a count default stored in the storage portion, and a control signal output portion for counting down a count value from the count default to zero and outputting the control signal with the pulse width determined by the pulse width determination portion.

In this case, it is necessary to increase the count default as the value of the charging voltage decreases.

Furthermore, to determine an optimal pulse width on the basis of the value of the charging voltage, the pulse width determination portion preferably determines the pulse width of the control signal on the basis of the value of the charging voltage at the time the count value reaches zero.

The present invention makes it possible to provide a charging device capable of outputting charging power in a wide voltage range of from tens to hundreds of volts to a battery or suchlike with high accuracy.

DETAILED DISCRIPTION OF THE PREFERED EMBODIMENTS

Hereinafter, a preferred embodiment of the charging device according to the present invention will be described with reference to the accompanying drawings. Note that in the following, a stationary charging device for charging an in-vehicle battery will be described by way of example, but the charging device according to the present invention is not limited to a stationary type.

[Configuration of Charging Device]

Figure 1:
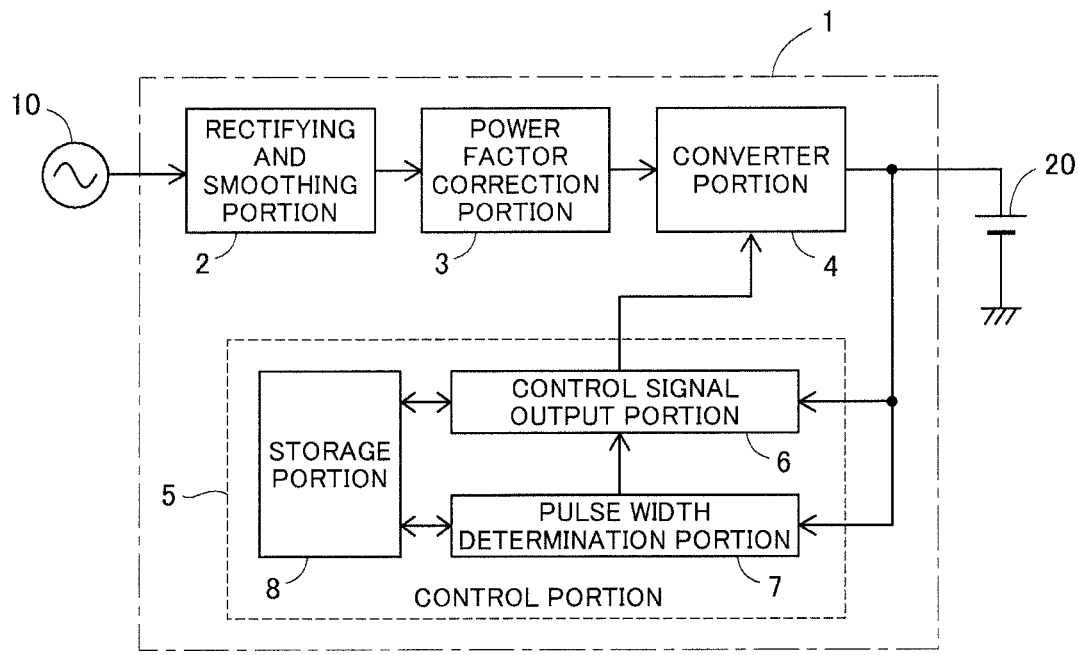
FIG. 1 is a block diagram illustrating an embodiment of a charging device according to the present invention.

FIG. 1 shows a block diagram of a charging device according to an embodiment of the present invention.

The charging device 1 converts an alternating-current voltage, which is supplied by an external alternating-current source 10, into a charging voltage at a desired value to be outputted to a battery 20, and the charging device 1 outputs the charging voltage to the battery 20. Naturally, the value of the charging voltage to be outputted varies among different types and statuses of use (remaining capacities) of batteries 20.

As shown in FIG. 1, the charging device 1 includes a rectifying and smoothing portion 2 for converting an alternating-current voltage, which is supplied by the alternating-current source 10, into a direct-current voltage by rectification and smoothing, a power factor correction portion 3 for power factor correction, which is a PFC circuit connected to the rectifying and smoothing portion 2 as its subsequent stage, a converter portion 4 for converting the direct-current voltage subjected to the rectification and smoothing and the power factor correction into charging power at a desired voltage value to be outputted to the battery 20, and a control portion 5 for controlling the converter portion 4 on the basis of the value of the charging voltage.

The converter portion 4 is a DC-DC converter in which a direct-current voltage outputted by its preceding stage is supplied to a series circuit consisting of a primary winding of a transformer and a switching element, and a rectification and smoothing circuit is connected to a secondary winding of the transformer. The value of the charging voltage to be outputted by the DC-DC converter can be changed by adjusting the on-period (duty cycle) of the switching element, i.e., by adjusting the pulse width of a control signal inputted to a control terminal of the switching element.

Specifically, to raise the value of the charging voltage, the pulse width of the control signal is widened so that the on-period of the switching element is lengthened. Moreover, to lower the value of the charging voltage, the pulse width of the control signal is narrowed so that the on-period of the switching element is shortened.

In the case where the interval at which to output the control signal is $d_1$ (referred to below as the "base interval"), the duty cycle of the control signal and the value of the charging voltage have a relationship shown in FIG. 4. Specifically, the converter portion 4 according to the present embodiment is assumed to be not capable of following a control signal having a pulse width of less than "base interval $d_1 \times 0.2$".

Note that the converter portion 4 is not limited to the DC-DC converter with the simplified configuration as described above, and can be configured arbitrarily so long as the value of the charging voltage can be changed in accordance with the pulse width of the control signal.

FIG. 1 will be referenced again.

The control portion 5 has a control signal output portion 6, a pulse width determination portion 7, and a storage portion 8. Among these, the control signal output portion 6 determines the interval at which to output a control signal, on the basis of the value of the charging voltage, and outputs control signals at the determined output intervals.

In the present embodiment, the output interval is set to base interval $d_1$ where the value of the charging voltage is 100V or more, the output interval is set to $d_2$ (=$d_1 \times 2$) where the value of the charging voltage is 50V or more but less than 100V, and furthermore, the output interval is set to $d_3$ (=$d_1 \times 4$) where the value of the charging voltage is less than 50V.

Figure 2:
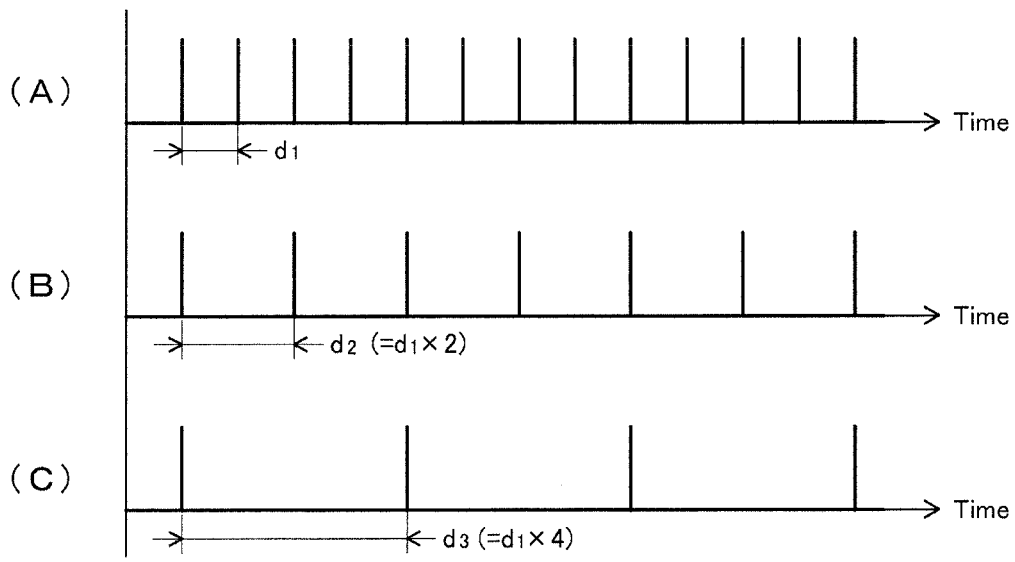
FIG. 2 is a waveform chart showing the operation of a control portion in the charging device according to the present invention.

FIG. 2 is a diagram comparing the timing of starting output of control signals.

As shown in the figure, timing (B) where the output interval is $d_2$ coincides with every second output with timing (A). Moreover, timing (C) where the output interval is $d_3$ coincides with every second output with timing (B). It should be noted that FIG. 2 shows only the timing of starting output of control signals, without considering the pulse width.

The pulse width determination portion 7 determines the pulse width of a control signal in accordance with a known PWM control law. For the charging device according to the present embodiment, the interval at which to output a control signal (=the switching cycle of the switching element) is variable, as described earlier, and therefore, in determining the pulse width, the interval at which to output a control signal is taken into consideration along with the value of the charging voltage. This will be described in detail later by giving a specific example.

The storage portion 8 has prestored data regarding intervals at which to output control signals ("count defaults" to be described later). The data are in correlation with values of charging voltages, so that if there is a known charging voltage value, data correlated therewith can be acquired.

[Operation of Charging Device]

Figure 3:
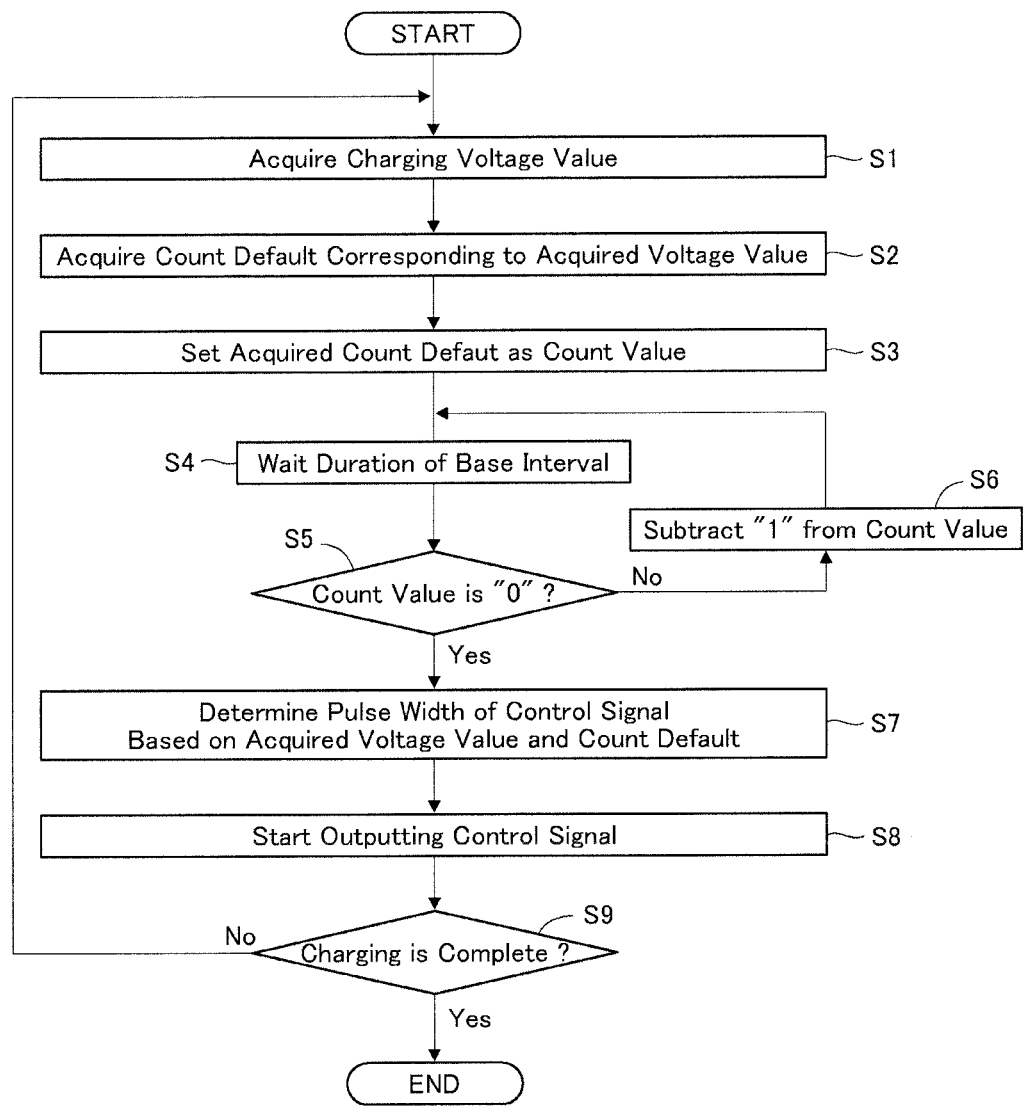
FIG. 3 is a flowchart illustrating the operation of the control portion in the charging device according to the present invention.

Next, the operation of the charging device 1 according to the present embodiment (in particular, the control portion 5) will be described in more detail with reference to FIG. 3.

Once charging starts, the control signal output portion 6 and the pulse width determination portion 7 acquire a charging voltage value in step S1, and then in step S2, the control signal output portion 6 and the pulse width determination portion 7 acquire a count default corresponding to the voltage value acquired in step S1.

In the present embodiment, the storage portion 8 has three count defaults $n_1$, $n_2$ (=$2 \times n_1$), and $n_3$ (=$2 \times n_2$=$4 \times n_1$) stored therein in correlation with voltage values; count default $n_1$ is acquired where the charging voltage value is 100V or more, count default $n_2$ is acquired where the charging voltage value is 50V or more but less than 100V, and count default $n_3$ is acquired where the charging voltage value is less than 50V.

In step S3, the control signal output portion 6 sets the acquired count default as a count value, and performs a loop process (wait time process) to keep subtracting "1" from the count value until the count value reaches "0" (steps S4 to S6). Specifically, the time taken for reducing the count value by "1" corresponds to base interval $d_1$, and the timing of outputting a pulse is delayed until the count value reaches "0", in accordance with base interval $d_1$×the count default. In this case, the interval at which to output a control signal is changed by changing the count default, so that some control signals are omitted compared to timing (A) shown in FIG. 2.

When the acquired count default is $n_1$, the countdown processing of step S6 is executed $n_1$ times. Once the count value reaches "0", the loop process in steps S4 to S6 ends, and the procedure advances to step S7.

The acquired count default changes in accordance with the charging voltage value, as described earlier.

In addition, the duration of the base interval is constant in step S4, and therefore, the duration to the end of the loop process in steps S4 to S6 is proportional to the count default. Accordingly, in the present embodiment, the duration to the end of the loop process in steps S4 to S6 changes in accordance with the charging voltage value.

Specifically, when the charging voltage value is 50V or more but less than 100V, the loop process ends after a lapse of double the duration as when the voltage value is 100V or more.

Furthermore, when the charging voltage value is less than 50V, the loop process ends after a lapse of four times the duration as when the voltage value is 100V or more.

In step S7, the pulse width determination portion 7 determines a pulse width on the basis of the acquired charging voltage value and the count value. Based on Equation 1: duty cycle=pulse width/{base interval $d_1$×(count default/$n_1$)}, the pulse width is determined by Equation 2 as follows:

$$\text{pulse width} = \text{base interval } d_1 \times \text{duty cycle} \times (\text{count default}/n_1).$$

For example, in the case of the charging voltage having a value of 100V, its corresponding duty cycle and count default are 20% (see FIG. 4) and $n_1$, respectively, and therefore, the pulse width is "$d_1$×0.2".

In the case where the charging voltage value is 50V, its corresponding duty cycle and count default are 10% and $n_2$, respectively, and therefore, the pulse width is "$d_1$×0.1×2".

Furthermore, in the case where the charging voltage value is 25V, its corresponding duty cycle and count default are 5% and $n_3$, respectively, and therefore, the pulse width is "$d_1$×0.05×4".

The above indicates that when a smaller duty cycle is required, the pulse width does not have to be changed.

In step S8, the control signal output portion 6 starts outputting a control signal with the determined pulse width. Since it takes little time to execute step S7, the control signal starts to be outputted as soon as the count value reaches "0".

After the control signal starts to be outputted, if the charging has not yet been completed ("No" in step S9), the procedure returns to step S1, and the same steps are sequentially executed. On the other hand, if the charging has already completed ("Yes" in step S9), the present flow ends.

Note that step S9 is executed at the same time as the control signal starts to be outputted, rather than after the outputting of the control signal ends. Moreover, the determination in step S9 takes little time.

Accordingly, at the second execution of step S1, the charging voltage value at the time the count value reaches "0" is acquired. As a result, it is possible to prevent excess or insufficient feedback control, along with resulting fluctuations in the charging voltage, due to the pulse width being determined on the basis of a charging voltage value at an inappropriate time during one switching cycle.

In other words, the charging device 1 according to the present embodiment makes it possible to determine a duty cycle and a count default that are optimal for setting the charging voltage value to a desired value.

Ultimately, the charging device 1 according to the present embodiment makes it possible to keep a low charging voltage value to be outputted by lengthening the interval at which to output a control signal (i.e., by omitting some control signals), rather than by narrowing the pulse width of the control signal.

Specifically, the charging device 1 according to the present embodiment allows the converter portion 4 to always operate in the range where the linearity of the duty cycle over the charging voltage (see FIG. 4) is maintained, so that the charging voltage can be outputted in a wide range of from tens to hundreds of volts with high accuracy.

While a preferred embodiment of the charging device according to the present invention has been described above, the present invention is not limited to the above configuration.

For example, the charging device according to the present invention can charge charging subjects other than in-vehicle batteries, e.g., capacitors. Since the voltage of the capacitor reaches approximately 0V due to discharging, the interval at which to output a control signal is maximum immediately after the start of charging, and thereafter, as the charging progresses, the output interval is gradually narrowed.

Note that the in-vehicle battery, which is a lithium-ion battery or suchlike, is normally not discharged to such an extent that a significant voltage drop occurs, and therefore, the output interval is not changed during charging.

Furthermore, in the above embodiment, the interval at which to output a control signal is changed using the count value, but the method for changing the output interval can be altered arbitrarily.

Figure 4:
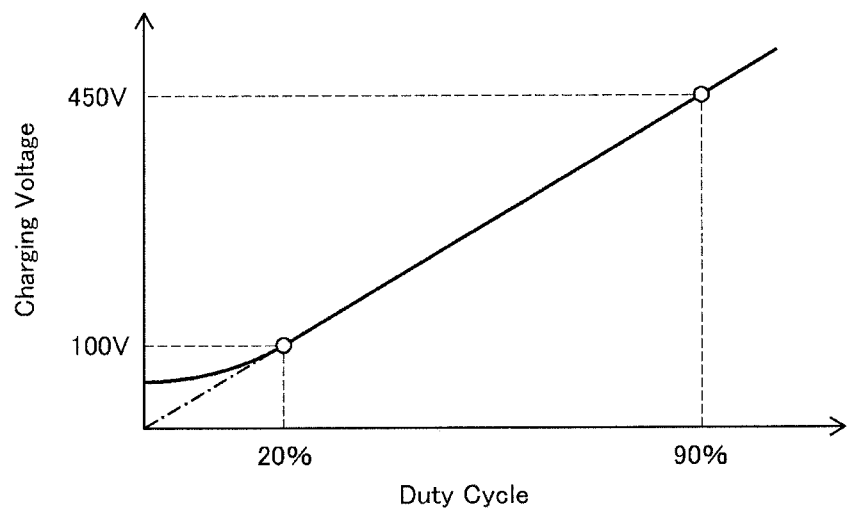
FIG. 4 is a graph showing the relationship between the duty cycle of a switching element and the charging voltage in a charging device.

Furthermore, in the above embodiment, the output interval varies among the range of 100V or more, the range of 50V or more but less than 100V, and the range of less than 50V, but the number of ranges (in the embodiment, three) and the boundary voltage values (in the embodiment, 100V and 50V) can be changed suitably in accordance with the characteristics of converter portions to be used (see FIG. 4).

DESCRIPTION OF THE REFERENCE CHARACTERS 1 charging device
2 rectifying and smoothing portion
3 power factor correction portion
4 converter portion
5 control portion
6 control signal output portion
7 pulse width determination portion
8 storage portion
10 alternating-current source
20 battery (charging subject)

The invention claimed is:
1. A charging device comprising:
a converter portion for outputting a charging voltage to a charging subject; and a control portion for outputting a control signal having a pulse width determined based on a value of the charging voltage to a switching element in the converter portion, thereby rendering the switching element in an on-state for a time period corresponding to the pulse width; and wherein the control portion changes an interval at which to output the control signal in accordance with the value of the charging voltage, thereby lengthening the output interval of the control signal as the value of the charging voltage decreases; and wherein the control portion comprises:
- a storage portion having count defaults stored therein in correlation with values of the charging voltage;
- a pulse width determination portion for determining a pulse width of the control signal on the basis of a value of the charging voltage and a count default stored in the storage portion;
- a control signal output portion for counting down a count value from the count default to zero and outputting the control signal with the pulse width determined by the pulse width determination portion, and the count default to be read from the storage portion increases as the value of the charging voltage decreases.

2. The charging device according to claim 1, wherein the pulse width determination portion determines the pulse width of the control signal on the basis of the value of the charging voltage at the time the count value reaches zero.

3. The charging device according to claim 1, wherein the control portion regularly omits the control signal which is otherwise kept outputted at predetermined intervals, thereby lengthening the output interval of the control signal that is actually outputted.

* * * * *